June 10, 1952 P. L. SAGALYN 2,600,268

ELECTRICAL CIRCUIT FOR PRODUCING CODING PULSES

Filed Oct. 19, 1945

INVENTOR.
PAUL L. SAGALYN
BY William D. Hall
ATTORNEY

Patented June 10, 1952

2,600,268

UNITED STATES PATENT OFFICE 2,600,268

ELECTRICAL CIRCUIT FOR PRODUCING CODING PULSES

Paul L. Sagalyn, Cambridge, Mass., assignor, by mesne assignments, to the United States of America as represented by the Secretary of War Application October 19, 1945, Serial No. 623,401

3 Claims. (Cl. 177—380)

Figures 1, 2:
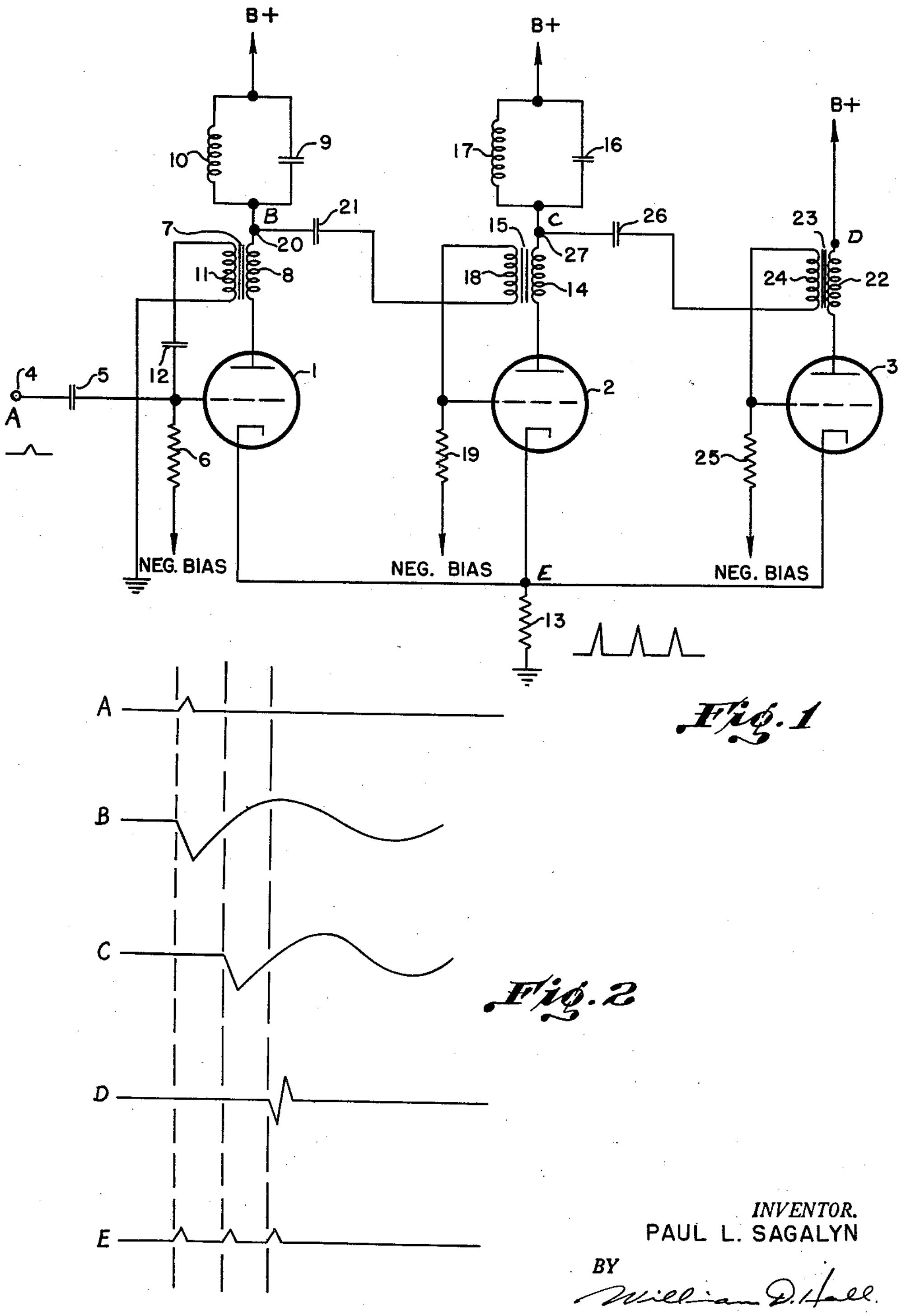

The invention relates in general to pulse generating circuits and more particularly to a circuit for producing a series of pips separated by predetermined time intervals. These pips may, for example, be used to code a beacon transmitter.

The output of the beacon transmitter is usually coded so as to permit an interrogating station to identify the beacon. One of the most common methods of coding is known as range coding. In this type of coding a series of pulses, each pulse separated by a predetermined time interval from the preceding pulse is sent out by the beacon in response to a signal from the interrogating station. These pulses appear on the screen of a cathode ray tube, associated with an interrogating station, as separate pips at different distances along the range axis. It is an object of this invention to devise a simple coding means for modulating the output of a beacon transmitter.

In many instances it is necessary to have a portable beacon which can be transported by aircraft. In beacons of this type it is particularly desirable to have all the components compact, of light weight and with low power drain. It is accordingly a further object of the invention to devise a circuit for a coding component which will be compact, light in weight, and have a low power drain.

Other objects and advantages will become readily apparent from the hereinafter described specification.

The coder circuit uses three vacuum tubes. The first two tubes are connected to the source of anode potential through tank or ringing circuits. Each of the three tubes has a winding of a blocking oscillator transformer in its anode circuit. The three tubes also have a common cathode resistor across which the positive coding pulses are developed.

The action of the coder is initiated by the application of a positive pulse, through a blocking capacitor, to a grid of a first tube. This begins the blocking oscillator action of the first tube, which draws a short heavy pulse of anode current, charging a capacitor in its tank circuit. This heavy pulse of current flowing through a common cathode resistor also gives the first coding pulse. The tank circuit capacitor at the same time will begin to discharge through the inductance, and oscillations begin. The second tube is a biased-off blocking oscillator arranged to fire on the rise of potential due to the oscillation of the first tank circuit. The time interval is approximately equal to one-half the natural period of oscillation of the tank circuit. This time interval determines the spacing between coding pulses. As soon as the second tube fires, a positive pulse appears across the common cathode resistor, and the tank circuit associated with the second tube begins to oscillate. The third tube will fire as soon as the potential, due to the oscillation of the tank circuit, reaches the proper value and a third positive pulse will appear across the common cathode resistor.

No tank circuit is used in the anode circuit of the third tube since only three pulses are desired from the circuit shown. This circuit may be adapted to provide as many pulses as desired by adding stages.

This circuit has a very low drain on the plate supply since all the tubes are normally biased off and each tube draws current only during its pulse.

In the drawing, Fig. 1 is a diagrammatic view of the preferred embodiment of my invention, and Fig. 2 shows schematically the wave forms appearing at various points in the circuit of Fig. 1.

Fig. 1 shows three triode type vacuum tubes to which the reference numerals 1, 2 and 3 have been applied. The grid of tube 1 is connected to a terminal A through capacitor 5. The grid is also connected to a source of negative potential through resistor 6. A blocking oscillator transformer 7 has one winding 8 connected between the anode of tube 1 and a terminal B of a tank or ringing circuit consisting of a capacitor 9 and inductance 10 in parallel. The other side of the tank circuit is connected to the source of anode potential. The other winding 11 of the transformer 7 has one terminal connected to the grid through capacitor 12 and the other directly to ground. The cathodes of tubes 1, 2 and 3 are connected to ground at a common terminal E through the common cathode resistor 13.

The anode of tube 2 is connected to the source of anode potential through a terminal C of a winding 14 of a blocking oscillator transformer 15 and through a tank or ringing circuit consisting of a capacitor 16 and inductance 17. The other winding 18 of the transformer has one terminal connected to the grid of tube 2 and then to a source of negative potential through resistor 19. The other terminal is connected to terminal B through blocking capacitor 21.

The anode of tube 3 is connected at a terminal D to the source of anode potential through the winding 22 of blocking oscillator transformer 23. The winding 24 of the transformer has one terminal connected to the grid and then to a source of negative bias through resistor 25. The other terminal of the winding 24 is connected through blocking capacitor 26 to terminal C.

The tubes 1, 2 and 3 are normally biased to cut off by means of the negative potential applied to the grids through resistors 6, 19 and 25 respectively. The initial trigger pulse is applied to terminal A from another circuit (not shown), The input impedance of the coder circuit should be designed to match the output impedance of the circuit supplying the trigger pulse.

If the coding circuit is used in a beacon, the trigger pulse will come from the discriminator which responds only to an R. F. beacon interrogating pulse of the proper frequency and duration.

The trigger pulse is applied at terminal A to the grid tube 1 through a blocking capacitor 5. This trigger pulse is shown in graph A of Fig. 2. The grid of this tube is connected to a source of negative potential through resistor 6. The positive pulse on the grid of tube 1 causes a sharp increase in anode current to be drawn through the winding 8. This pulse of current, appearing at terminal B and shown in graph B of Fig. 2, induces a pulse of voltage on the winding 11 of the transformer 7 and initiates the blocking oscillator action. The heavy pulse of current, drawn by the tube during the blocking oscillator action, causes a positive pulse of voltage to appear at common terminal E across the common cathode resistor 13. This pulse of current, shown as the first pulse in graph E of Fig. 2, also charges capacitor 9 which starts to oscillate with inductance 10. The rise of potential at terminal B due to this oscillation is transmitted to the grid of tube 2 through capacitor 21. Tube 2 will begin to conduct, initiating blocking oscillator action after a time interval equal to approximately half the natural period of oscillation of capacitor 9 and inductance 10. The tube 2 will draw a heavy pulse of current appearing at terminal C and shown in graph C of Fig. 2 due to blocking oscillator action, which also appears at terminal E across resistor 13 as a second pulse or pip which is spaced from the first pip by a time interval equal to the delay in the firing of tube 2. This second pulse is shown as the second pulse in graph E of Fig. 2.

The aforementioned second pulse of current charges capacitor 16 which begins to oscillate with inductance 17 and, after a time interval equal to approximately half the natural period of oscillation of capacitor 16 and inductance 17, tube 3 will begin to conduct, causing a current pulse to appear at terminal D, as shown in graph D of Fig. 2, and a third pip will appear across resistor 13. This third pip is shown as the third pulse in graph E of Fig. 2.

If the period of oscillation of capacitor 9 and inductance 10 is the same as for capacitor 16 and inductance 17, the interval between the first and second pips will be the same as between the second and third pips. The oscillations of the two tank circuits are damped by resistors 19 and 25 and the time of recovery for the tubes is sufficiently long so that they are triggered only once. The tubes will not fire again until a new trigger pulse is applied to terminal A. The length of the time interval between pips can be changed by using a different value for the capacitor or by changing the value of the negative bias.

The trigger pulses or pips from across resistor 13 may be used to fire a beacon transmitter either directly or through a modulator.

It will be apparent that there may be deviations from the invention as described which still fall fairly within the spirit and scope of the invention. For example negative pips may be obtained from the circuit by using a common resistor between the source of anode potential and the anodes of the three tubes.

Accordingly, I claim all such deviations which fall fairly within the spirit and scope of the invention as identified in the hereinafter appended claims.

What is claimed is:

1. An electric circuit for producing coding pulses comprising a first blocking oscillator pulse generator including a vacuum tube having an anode, a cathode, and at least one control grid, said tube being biased to cut-off, means for applying unblocking pulses to the cathode-grid circuit of said first pulse generator, a load connected between said cathode and anode, a tank circuit connected between said cathode and anode, a second blocking oscillator pulse generator including a vacuum tube having a cathode, an anode, and at least one control grid, said last-mentioned tube being biased to cut-off, means coupling said tank circuit to the cathode-grid circuit of said second pulse generator for unblocking said second pulse generator during the second half of an oscillation of said tank circuit started by a pulse from said first pulse generator, and means coupling the output of said second pulse generator to said load.

2. An electric circuit for producing coding pulses comprising a first blocking oscillator pulse generator including a vacuum tube having an anode, a cathode, and at least one control grid, said tube being biased to cut-off, means for applying unblocking pulses to the cathode-grid circuit of said first pulse generator, a load connected between said cathode and a point of common potential, a tank circuit coupled between said anode and said point of common potential, a second blocking oscillator pulse generator including a vacuum tube having a cathode, an anode and at least one control grid, said last-mentioned tube being biased to cut-off, means coupling said tank circuit to the cathode-grid circuit of said second pulse generator to unblock said second pulse generator during the second half of an oscillation of said tank circuit started by a pulse from said first pulse generator, and means coupling the cathode of said second pulse generator to said load.

3. A circuit according to claim 2 further comprising a third blocking oscillator pulse generator including a vacuum tube having a cathode, an anode, and at least one control grid, said last-mentioned tube being biased to cut-off, a second tank circuit connected between the anode of the vacuum tube of said second pulse generator and said point of common potential and coupled to the cathode-grid circuit of said third pulse generator to unblock said third pulse generator during the second half of an oscillation of said second tank circuit started by a pulse from said second pulse generator, and means coupling the cathode of the vacuum tube of said third pulse generator to said load.

PAUL L. SAGALYN.

REFERENCES CITED

The following references are of record in the file of this patent:

UNITED STATES PATENTS

| Number | Name | Date |
|---|---|---|
| 2,076,335 | Dallenbach | Apr. 6, 1937 |
| 2,277,000 | Bingley | Mar. 17, 1942 |
| 2,398,771 | Compton | Apr. 23, 1946 |
| 2,409,229 | Smith | Oct. 15, 1946 |
| 2,421,606 | Fitch | June 3, 1947 |